United States Patent
Tang et al.

(10) Patent No.: US 9,720,012 B2
(45) Date of Patent: Aug. 1, 2017

(54) MULTI-AXIS INERTIAL SENSOR WITH DUAL MASS AND INTEGRATED DAMPING STRUCTURE

(71) Applicant: FREESCALE SEMICONDUCTOR, INC., Austin, TX (US)

(72) Inventors: Jun Tang, Gilbert, AZ (US); Aaron A. Geisberger, Austin, TX (US); Margaret L. Kniffin, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 134 days.

(21) Appl. No.: 14/805,105

(22) Filed: Jul. 21, 2015

(65) Prior Publication Data

US 2017/0023608 A1    Jan. 26, 2017

(51) Int. Cl.
*G01P 15/125* (2006.01)
*G01P 15/18* (2013.01)
*G01P 15/08* (2006.01)

(52) U.S. Cl.
CPC ............ *G01P 15/18* (2013.01); *G01P 15/125* (2013.01); *G01P 2015/0831* (2013.01); *G01P 2015/0882* (2013.01)

(58) Field of Classification Search
CPC ................................ G01P 15/125; G01P 15/18
See application file for complete search history.

(56) References Cited

U.S. PATENT DOCUMENTS

| | | | |
|---|---|---|---|
| 6,845,670 B1 * | 1/2005 | McNeil | G01P 15/125 73/510 |
| 8,372,677 B2 | 2/2013 | Mehregany | |
| 2004/0079154 A1 * | 4/2004 | Yoshikawa | G01P 15/125 73/514.32 |

(Continued)

FOREIGN PATENT DOCUMENTS

| | | |
|---|---|---|
| EP | 2 775 309 A1 | 9/2014 |
| WO | 2013116356 A1 | 8/2013 |

OTHER PUBLICATIONS

Qu et al, A Monolithic CMOS-MEMS 3-Axis Accelerometer with a Low-Noise, Low-Power Dual-Chopper Amplifier, IEEE Sensors Journal, Sep. 2008, pp. 1511-1518, vol. 8, No. 9.

(Continued)

*Primary Examiner* — Helen Kwok
(74) *Attorney, Agent, or Firm* — Charlene R. Jacobson (57) ABSTRACT

An inertial sensor includes first and second movable elements suspended from a substrate and interconnected by a beam. The second movable element is positioned laterally adjacent to the first movable element, and each of the movable elements has a mass that is asymmetric relative to a rotational axis. A first spring system couples the first movable element to the substrate and a second spring system couples the second movable element to the substrate. The spring systems and the beam enable the movable elements to move together in response to force imposed upon the movable elements. In particular, the first and second movable elements can undergo in-plane torsion motion in (Continued)

response to force, such as acceleration, imposed in a sense direction. Additionally, damping structures may be integrated into the first and second movable elements to effectively increase a damping ratio of the device resulting from the in-plane torsion motion.

19 Claims, 5 Drawing Sheets

(56) References Cited

U.S. PATENT DOCUMENTS

| | | | |
|---|---|---|---|
| 2008/0314147 A1 | 12/2008 | Nasiri et al. | |
| 2010/0011860 A1* | 1/2010 | Offenberg | G01P 15/125 73/514.32 |
| 2010/0107763 A1* | 5/2010 | Lin | G01P 15/125 73/514.32 |
| 2010/0122579 A1* | 5/2010 | Hsu | G01P 15/125 73/514.32 |
| 2010/0281980 A1* | 11/2010 | Yazawa | B81B 3/0078 73/514.32 |
| 2011/0203373 A1* | 8/2011 | Konno | G01P 15/0802 73/514.32 |
| 2012/0000287 A1* | 1/2012 | Frangi | G01P 15/18 73/514.32 |
| 2012/0031185 A1* | 2/2012 | Classen | G01P 15/125 73/514.14 |
| 2012/0186347 A1* | 7/2012 | McNeil | G01P 15/125 73/514.32 |
| 2013/0125649 A1* | 5/2013 | Simoni | G01P 15/18 73/504.04 |
| 2014/0137670 A1* | 5/2014 | Hata | G01L 1/144 73/862.621 |
| 2014/0144234 A1* | 5/2014 | Tsai | B81B 3/0081 73/514.32 |
| 2015/0029690 A1* | 1/2015 | Tanaka | G01P 15/125 361/777 |
| 2015/0268269 A1* | 9/2015 | Jia | G01P 15/18 73/514.32 |
| 2016/0084872 A1* | 3/2016 | Naumann | G01P 15/125 73/514.32 |
| 2016/0097792 A1* | 4/2016 | Naumann | G01P 15/18 73/504.02 |
| 2016/0169927 A1* | 6/2016 | Lin | G01P 15/125 73/488 |
| 2016/0209442 A9* | 7/2016 | Tanaka | G01P 15/125 73/514.32 |

OTHER PUBLICATIONS

Extended European Search Report for Patent Appln. No. 16180155.0 (Oct. 5, 2016).

* cited by examiner

MULTI-AXIS INERTIAL SENSOR WITH DUAL MASS AND INTEGRATED DAMPING STRUCTURE

TECHNICAL FIELD OF THE INVENTION

The present invention relates generally to microelectromechanical systems (MEMS) devices. More specifically, the present invention relates to MEMS devices such as three-axis accelerometers.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensors are widely used in applications such as automotive, inertial guidance systems, household appliances, game devices, protection systems for a variety of devices, and many other industrial, scientific, and engineering systems.

One example of a MEMS sensor is a MEMS accelerometer. MEMS accelerometers are sensitive to acceleration or acceleration forces. These forces may be static, like the constant force of gravity, or they can be dynamic, caused by moving or vibrating the sensor. Accelerometers may sense acceleration forces along one, two, or three axes or directions. From this information, the movement or orientation of the device in which the accelerometer is installed can be ascertained.

Commonly, MEMS accelerometers react to acceleration with a change in electrical capacitance, which causes the output of an energized circuit, connected to the sensor, to vary. One common form of MEMS accelerometer uses one or more movable structures that move under acceleration above a substrate. The movement of the movable structure changes capacitance, and the electrical circuit connected to the MEMS accelerometer structure measures the change in capacitance to determine the acceleration forces. Such MEMS accelerometers are widely used in a variety of sensing applications. For example, vehicle or automotive applications may use MEMS accelerometers to determine when to deploy the vehicle airbag or activate a stability and/or traction control system. In addition, consumer electronics devices, such as video game controllers, personal media players, cell phones, and digital cameras, also use MEMS accelerometers in various applications to detect the orientation and/or respond to movement of the device.

Traditionally, in order to sense motion along multiple axes, accelerometers have been provided that include multiple sense masses that move independently of one another in response to accelerations. As these devices continue to shrink in size, it becomes desirable to reduce the collective size of these sense masses. But reducing the collective size of the sense masses can make it increasingly difficult to provide the desired sensitivity and reliability.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

DETAILED DESCRIPTION

In overview, the embodiments disclosed herein entail microelectromechanical systems (MEMS) devices with improved sensitivity and reliability in the small form factors desired for present applications. These MEMS devices can include inertial sensors such as MEMS accelerometers, and in particular, three-axis MEMS accelerometers that can sense acceleration in three orthogonal directions (e.g., X-direction, Y-direction, Z-direction) defined by three axes (e.g., X-axis, Y-axis, and Z-axis). In general, embodiments described herein can provide relatively small device size, with improved sensitivity and reliability, by facilitating the sharing of proof masses for sensing in all three directions. More particularly, a MEMS inertial sensor includes a dual proof mass configuration that can undergo relatively large deformation under in-plane torsion motion in response to force imposed in a sense direction. This relatively large deformation can provide improved sensitivity in the sense direction. Additionally, a damping structure may be integrated into the MEMS inertial sensor to effectively achieve a greater damping ratio for the in-plane torsion motion with negligible impact on device sensitivity in the sense direction. The dual proof mass configuration and the damping structure may improve the overall efficiency of in-plane torsion motion of the MEMS device. Although a MEMS inertial sensor in the form of an accelerometer is described herein, it should be understood that the dual proof mass configuration and the damping structure may be adapted for use in other MEMS devices to achieve improvements in sensitivity and/or reliability.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Figure 1:
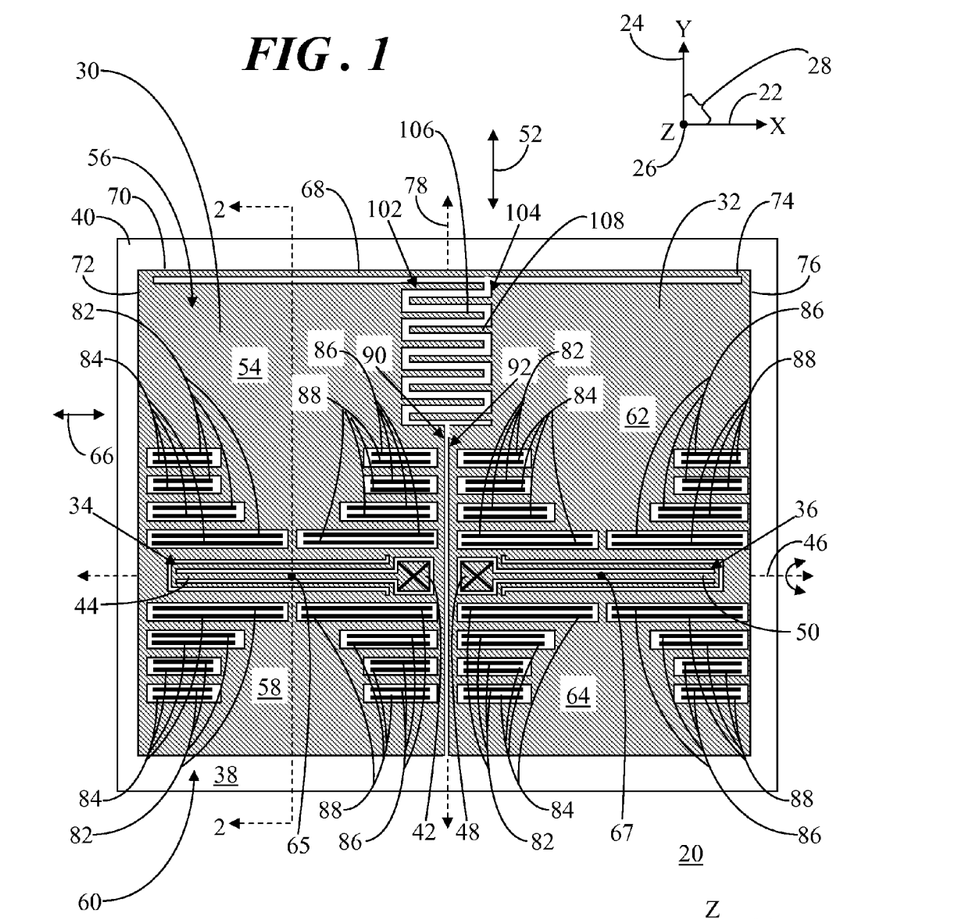
FIG. 1 shows a top view of a microelectromechanical systems (MEMS) inertial sensor in accordance with an embodiment.
Figure 2:
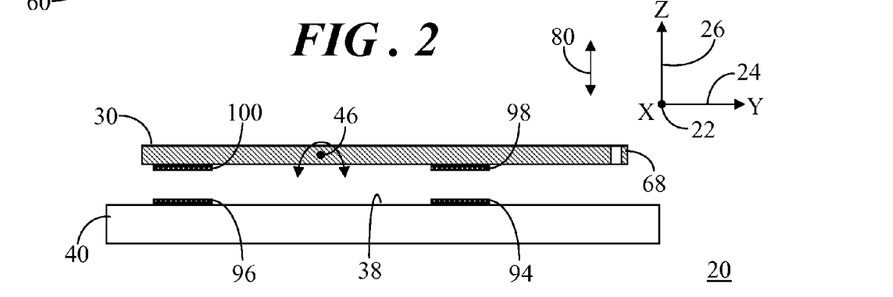
FIG. 2 shows a side view of the MEMS inertial sensor along section lines 2-2 in FIG. 1.

Referring to FIGS. 1 and 2, FIG. 1 shows a top view of a MEMS inertial sensor 20 in accordance with an embodiment, and FIG. 2 shows a side view of MEMS inertial sensor 20 along section lines 2-2 in FIG. 1. MEMS inertial sensor 20 is generally configured to sense acceleration forces in three orthogonal directions (e.g., X-direction, Y-direction, Z-direction) defined by three axes, an X-axis 22, a Y-axis 24, and a Z-axis 26 in a three dimensional coordinate system. Accordingly, MEMS inertial sensor 20 is referred to herein as an accelerometer 20. By convention, accelerometer 20 is illustrated as having a generally planar structure within an X-Y plane 28, wherein X-axis 22 is directed rightward and leftward on the page, Y-axis 24 is directed upward and downward on the page, and Z-axis 26 is directed out of the page (normal to X-Y plane 28 in FIG. 1). Correspondingly, in the side view illustration of FIG. 2, the three dimensional coordinate system is represented in which Y-axis 24 is directed rightward and leftward on the page, Z-axis 26 is directed upward and downward on the page, and X-axis 22 is directed out of the page.

Accelerometer 20 generally includes two movable elements, referred to herein as a first proof mass 30 and a second proof mass 32, in which second proof mass 32 is positioned laterally adjacent to first proof mass 30. Accelerometer 20 further includes two suspension spring systems, referred to herein as a first spring system 34 and a second spring system 36. First spring system 34 is configured to movably couple first proof mass 30 to a surface 38 of a substrate 40. Likewise, second spring system 36 is configured to movably couple second proof mass 32 to surface 38 of substrate 40. It should be understood that the terms "first," "second," "third," "fourth," and so on used herein do not refer to a sequential ordering or prioritization of the elements of accelerometer 20. Instead, the terms "first," "second," "third," "fourth," and so on are used to distinguish the various elements from one another for clarity of description.

In an embodiment, first spring system 34 includes a first anchor element 42 and a first spring 44. First anchor element 42 is coupled to substrate 40 at a rotational axis 46 (discussed below) of first proof mass 30, and first spring 44 is interconnected with first anchor element 42 and first proof mass 30. Similarly, second spring system 36 includes a second anchor element 48 and a second spring 50. Second anchor element 48 is coupled to substrate 40 at rotational axis 46, and second spring 50 is interconnected with second anchor element 48 and second proof mass 32.

First and second spring systems 34, 36 facilitate translatory motion of their corresponding first and second proof masses 30, 32 in response to an acceleration force imposed upon first and second proof masses 30, 32 in a first direction substantially parallel to surface 38 of substrate 40. In the illustrated embodiment, the acceleration force is substantially parallel to Y-axis 24. Thus, the direction of the acceleration force is referred to herein as a Y-direction 52. In response to the acceleration force in Y-direction 52, first and second proof masses 30, 32 will move together, both undergoing translatory motion in Y-direction 52. This translatory motion of first and second proof masses 30, 32 is used to detect acceleration in Y-direction 52 substantially parallel to surface 38 of substrate 40.

In an embodiment, each of first and second proof masses 30, 32 has asymmetric mass relative to rotational axis 46. In the illustrated embodiment, rotational axis 46 is substantially parallel to X-axis 22. That is, first proof mass 30 includes a first portion 54 positioned on a first side 56 of rotational axis 46 and a second portion 58 positioned on a second side 60 of rotational axis 46. Likewise, second proof mass 32 includes a third portion 62 positioned on first side 56 of rotational axis 46 and a fourth portion 64 positioned on second side 60 of rotational axis 46. As such, first and third portions 54, 62 are disposed adjacent to one another at first side 56 and second and fourth portions 58, 64 are disposed adjacent to one another at the opposing second side 60 of rotational axis 46.

First and third portions 54, 62 have greater mass than second and fourth portions 58, 64. This can be accomplished, in some embodiments, by offsetting rotational axis 46 from a geometric center of first and second proof masses 30, 32. Due to the configuration of first and second spring systems 34, 36 and the asymmetric mass, first and second proof masses 30, 32 can undergo in-plane torsion motion (i.e., pivotal motion about Z-axis 26) in response to an acceleration force imposed upon first and second proof masses 30, 32 in a second direction that is also substantially parallel to surface 38 of substrate 40. In the illustrated embodiment, the acceleration force is substantially parallel to X-axis 22. Thus, the direction of the acceleration force is referred to herein as an X-direction 66. In response to the acceleration force in X-direction 66, first and second proof masses 30, 32 will move together, both undergoing in-plane torsion motion about a pivot axis that is substantially perpendicular to X-Y plane 28, i.e., about Z-axis 26.

In an embodiment, first proof mass 30 will undergo in-plane torsion motion about a first pivot axis, represented by a dot 65 in FIG. 1, in response to acceleration force in X-direction 66. First pivot axis 65 is generally located at rotational axis 46 and is approximately centered on first proof mass 30 relative to X-axis 22. Likewise, second proof mass 32 will undergo in-plane torsion motion about a second pivot axis, represented by a dot 67 in FIG. 1, in response to acceleration force in X-direction 66. Second pivot axis 67 is generally located at rotational axis 46 and is approximately centered on second proof mass 32 relative to X-axis 22. The in-plane torsion motion of first and second proof masses 30, 32 is used to detect acceleration in X-direction 66 substantially parallel to surface 38 of substrate 40 and perpendicular to Y-direction 52.

It should be observed that a beam 68 is interconnected between first and second proof masses 30, 32. In particular, beam 68 has a first end 70 coupled to a first outer edge 72 of first portion 54 of first proof mass 30 and a second end 74 coupled to a second outer edge 76 of third portion 62 of second proof mass 32. First and second outer edges 72, 76 are distal from a midline 78 of accelerometer 20 disposed between first and second proof masses 30, 32. Beam 68 is sufficiently stiff in the vertical direction parallel to Z-axis 26 to largely prevent a "wobbling" motion of first and second proof masses 30, 32 under acceleration parallel to Z-axis 26.

Additionally, first and second spring systems 34, 36 further facilitate out-of-plane rotational motion of first and second proof masses 30, 32 about rotational axis 46 in response to acceleration force in a direction that is substantially parallel to Z-axis 26. That is, first and second spring systems 34, 36 facilitate teeter-totter like rotation of first and second proof masses 30, 32 about rotational axis 46. The asymmetric mass and rotation about rotational axis 46 enables first and second proof masses 30, 32 to detect acceleration in a third direction, referred to herein as a Z-direction 80 (FIG. 2) parallel to Z-axis 26 and orthogonal to surface 38 of substrate 40. In response to acceleration force in Z-direction 80, first and second proof masses 30, 32 will move together, both undergoing out-of-plane rotational motion about rotational axis 46. Thus, in the illustrated embodiment, accelerometer 20 is a multi-axis sensing device adapted to detect acceleration forces along three orthogonal axes.

Electrodes 82, 84, 86, 88 are coupled to surface 38 of substrate 40 and can be disposed in openings extending through both of first and second proof masses 30, 32. Electrodes 82, 84, 86, 88 are used for differential signal evaluation in order to sense acceleration in each of Y-direction 52 and X-direction 66 as changes in capacitance between electrodes 82, 84, 86, 88 and first and second proof masses 30, 32. Electrodes 82, 84, 86, 88 may be positioned as close to rotational axis 46 as possible (relative to Y-direction 52) in order to minimize the cross coupling of sense signals between rotational motion of first and second proof masses 30, 32 about rotational axis 46 and displacements (translatory motion or in-plane rotary motion) of first and second proof masses 30, 32 resulting from acceleration in either of Y-direction 52 and/or X-direction 66.

The most effective location for detecting in-plane torsion motion is as far away from the pivot axis as possible. Thus, typical configurations can have a single proof mass with electrodes positioned at outboard locations of the proof mass (relative to X-direction 66). The dual proof mass configuration of accelerometer 20 enables placement of electrodes on both sides (relative to X-direction 66) of the two pivot axes 65, 67. Accordingly, for first proof mass 30, electrodes 82, 84 are positioned proximate first outer edge 72 and electrodes 86, 88 are positioned proximate a first inner edge 90 of first proof mass 30, where first inner edge 90 resides closer to midline 78 of accelerometer 20 than first outer edge 72. Conversely, for second proof mass 32, electrodes 82 84 are positioned proximate a second inner edge 92 of second proof mass 32 and electrodes 86, 88 are positioned proximate second outer edge 76, where second inner edge 100 resides closer to midline 78 of accelerometer 20 than second outer edge 76. The dual proof mass structure of accelerometer 20, with each proof mass 30, 32 pivoting about its respective pivot axis 65, 67 and the inclusion of electrodes 82, 84, 86, 88 at locations of relatively large deformation under in-plane motion yields relatively high changes in capacitances and thereby enhanced sensitivity to acceleration force in X-direction 66 (i.e., X-axis acceleration).

Again, the motion of first and second proof masses 30, 32 is additionally based upon a teeter-totter principal of operation for differential signal evaluation in order to detect acceleration in Z-direction 80 substantially parallel to Z-axis 26. Accordingly, electrodes 94, 96 are formed on surface 38 of substrate 40 underlying each of first and second proof masses 30, 32 on opposing sides of rotational axis 46. Corresponding electrodes 98, 100 are formed on the lower side of first and second proof masses 30, 32 or are integral to first and second proof masses 30, 32. Electrodes 98, 100 are shown extending outwardly from the lower side of first and second proof masses 30, 32 for illustrative purposes, with electrode 98 facing electrode 94 and electrode 100 facing electrode 96.

Electrodes 94, 96, 98, 100 are used to detect acceleration in Z-direction 80 as a change in capacitance between electrodes 94, 96 and first and second proof masses 30, 32. Electrodes 94, 96, 98, 100 may be positioned as far away from rotational axis 46 (represented by a dot in FIG. 2) as possible, and are displaced away from rotational axis 46 by an equivalent distance. The displaced position of electrodes 94, 96, 98, 100 results in greater gap width changes as first and second proof masses 30, 32 pivot about rotational axis 46, relative to locations that are closer to rotational axis 46, so as to yield relatively high changes in capacitance and thereby enhanced sensitivity.

In a multiple axis accelerometer, it is difficult to match the damping ratio for in-plane torsion motion (for example, resulting from acceleration forces in X-direction 66) with out-of-plane sense motion (for example, resulting from acceleration forces in Z-direction 80). Indeed, the damping ratio of the in-plane torsion motion can be significantly lower than the damping ratio of the out-of-plane sense motion. A low damping ratio (i.e., an underdamped device) can result in a high amplitude resonant peak that can potentially damage the accelerometer. Additionally, a low damping ratio makes it difficult to increase the bandwidth of the accelerometer.

In some embodiments, accelerometer 20 can include a damping system in order to effectively increase the damping ratio for in-plane torsion motion. As such, accelerometer 20 further includes a first damping structure 102 extending from first inner edge 90 of first portion 54 of first proof mass 30. Similarly, accelerometer 20 further includes a second damping structure 104 extending from second inner edge 92 of third portion 62 of second proof mass 32 and directed toward first proof mass 30. Thus, first and second damping structures 102 and 104 are located distant from rotational axis 46 at the heavy ends of first and second proof masses 30, 32.

Second damping structure 104 is operatively coupled with first damping structure 102 to dampen an oscillatory response of first and second proof masses 30, 32. In particular, first damping structure 102 includes a plurality of first fingers 106 extending from first proof mass 30 and second damping structure 104 includes a plurality of second fingers 108 extending from second proof mass 32, that are interleaved with first fingers 106. As will be discussed in connection with FIGS. 7 and 8, the interleaved fingers 106, 108 of first and second damping structures 102, 104 function cooperatively to dampen the oscillatory response of first and second proof masses 30, 32 resulting from in-plane torsion motion.

Figure 3:
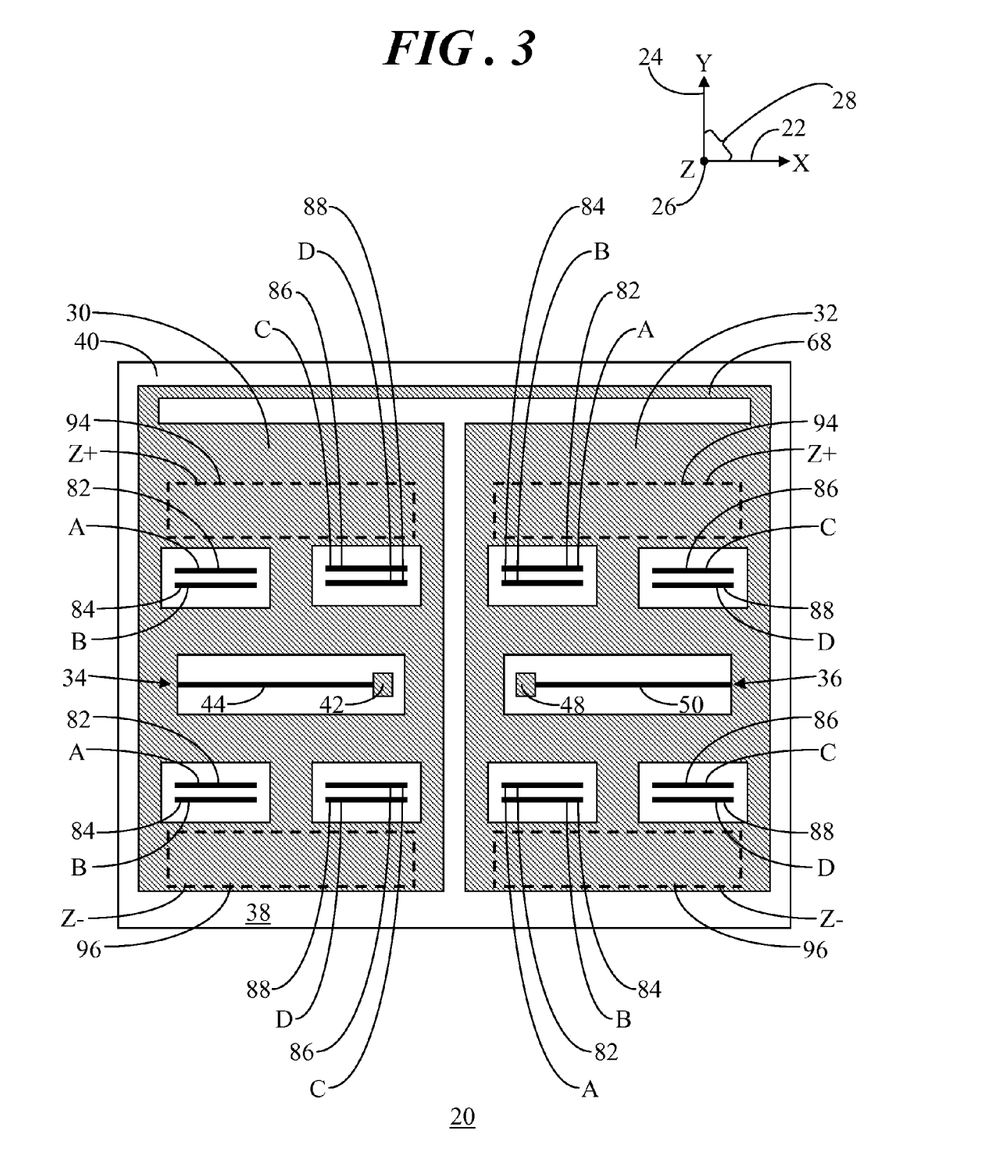
FIG. 3 shows a simplified top view of the MEMS inertial sensor.

FIG. 3 shows a simplified top view of the MEMS inertial sensor, i.e., accelerometer 20. In FIG. 3, accelerometer 20 is represented in an inactive state in which it is not currently being subjected to the acceleration forces to be measured or otherwise detected. The simplified top view of accelerometer 20 includes first and second proof masses 30, 32 interconnected via beam 68. First proof mass 30 is suspended above surface 38 of substrate 40 via first spring system 34 which includes first anchor element 42 and first spring 44. Likewise, second proof mass 32 is suspended above surface 38 of substrate via second spring system 36 which includes second anchor element 48 and second spring 50. First and second damping systems 102, 104 (FIG. 1) are not shown in FIG. 3 and the ensuing FIGS. 4-6 for simplicity of illustration.

Electrodes 82, 84, 86, 88 are collectively represented by a single corresponding electrode 82, 84, 86, 88 in their corresponding quadrants of first and second proof masses 30, 32 for simplicity of illustration. Additionally, electrodes 82 are labeled "A," electrodes 84 are labeled "B," electrodes 86 are labeled "C," and electrodes 88 are labeled "D" in FIG. 3. Electrodes 94, 96 formed on surface 38 of substrate 40 are obscured from view in FIG. 3 by first and second proof masses 30, 32, and are thus shown in dashed line form. Additionally, electrodes 94 are labeled "Z+" and electrodes 96 are labeled "Z−" in FIG. 3.

Figure 4:
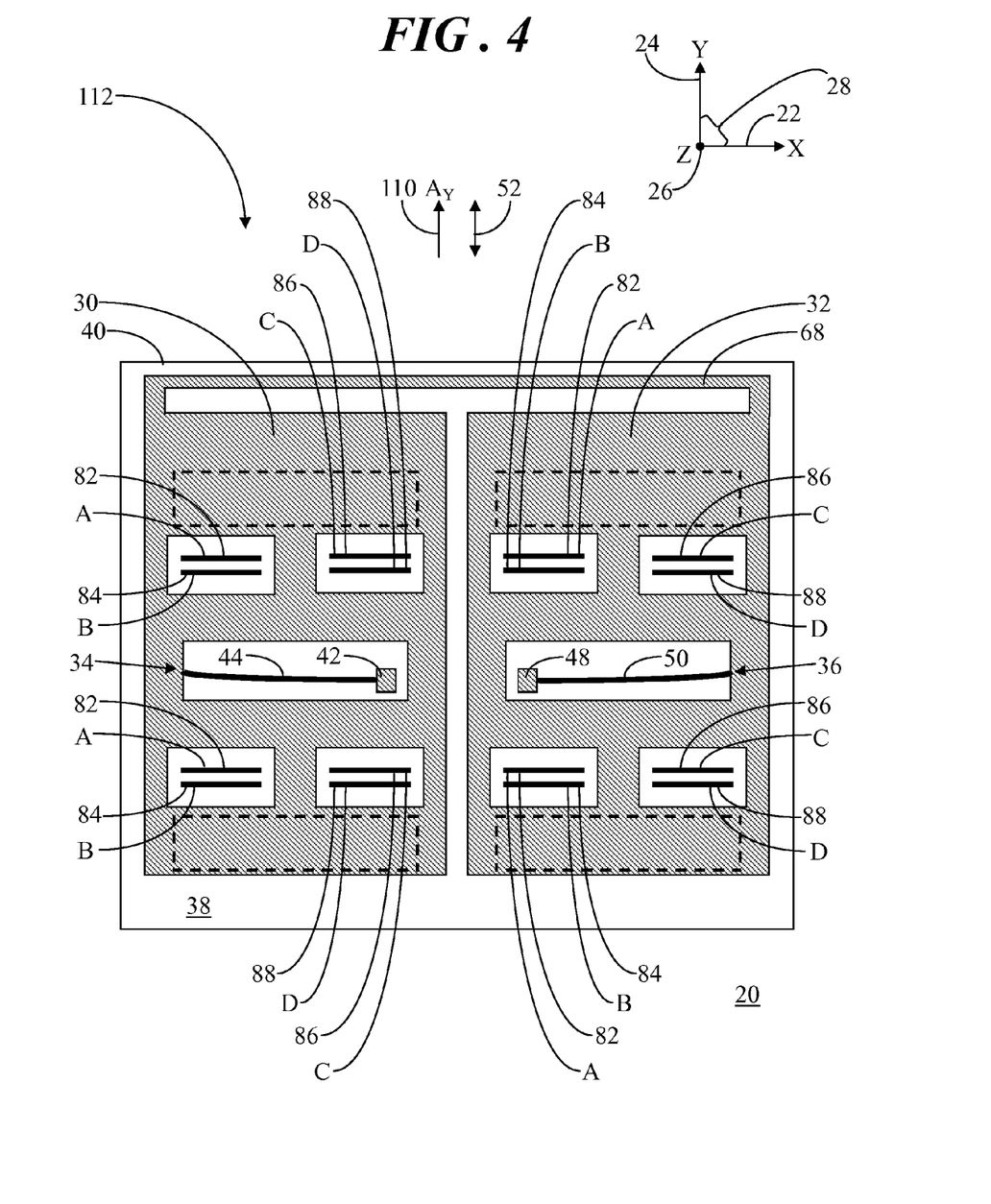
FIG. 4 shows the simplified top view of the MEMS inertial sensor being subjected to an acceleration force in a first direction.

FIG. 4 shows the simplified top view of accelerometer 20 from FIG. 3 being subjected to an acceleration force in a first direction. More particularly, accelerometer 20 is being subjected to an acceleration force 110 in Y-direction 52 substantially parallel to Y-axis 24. Thus, acceleration force 110 is referred to herein as Y-axis acceleration 110 and is labeled $A_Y$ in FIG. 4. First and second spring systems 34, 36 facilitate translatory motion of first and second proof masses 30, 32 in response to Y-axis acceleration 110 imposed upon first and second proof masses 30, 32 in Y-direction 52 substantially parallel to surface 38 of substrate 40. By way of example, as shown in FIG. 4, first and second proof masses 30, 32 have moved upward on the page substantially parallel to Y-axis 24. Thus, FIG. 4 demonstrates translatory motion 112 of first and second proof masses 30, 32 in response to Y-axis acceleration 110.

For Y-axis acceleration ($A_Y$), the capacitance change values ($\Delta C$) between electrodes 82, 84, 86, 88 and first and second proof masses 30, 32 can be used in a differential fashion to determine an output signal indicative of a magnitude of Y-axis acceleration 110, as follows:

$$A_Y = (\Delta C_A + \Delta C_C) - (\Delta C_B + \Delta C_D)$$

Figure 5:
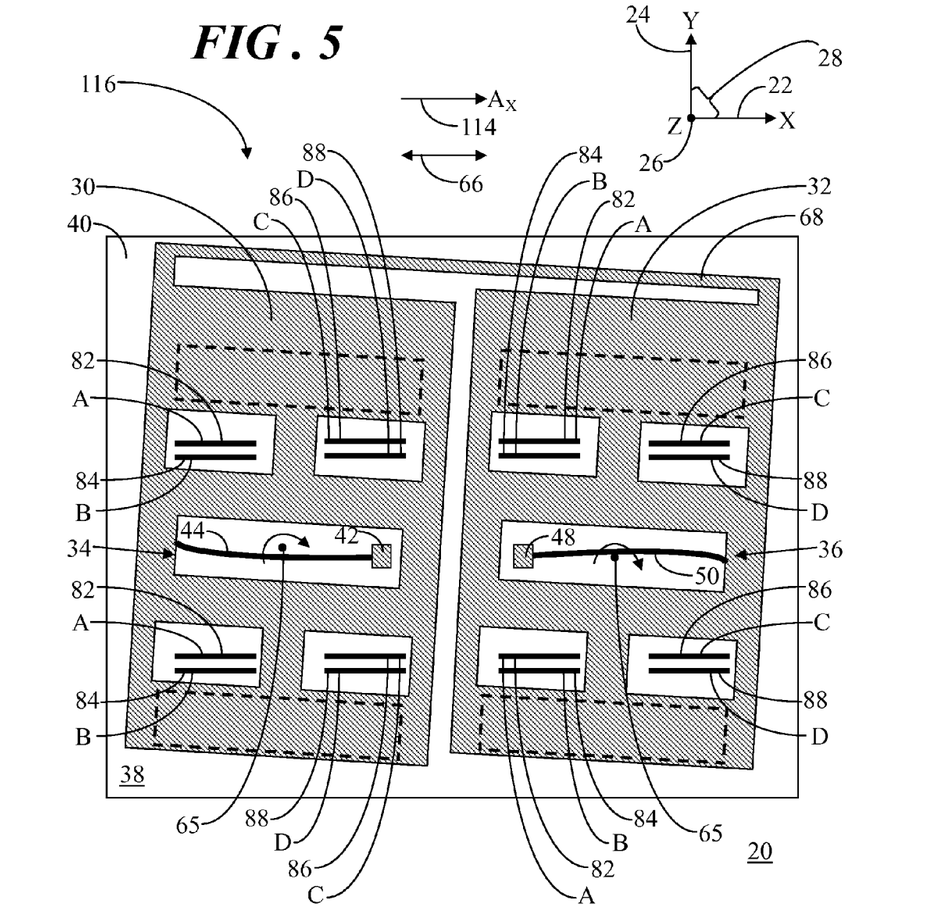
FIG. 5 shows the simplified top view of the MEMS inertial sensor being subjected to an acceleration force in a second direction.

FIG. 5 shows the simplified top view of accelerometer 20 from FIG. 3 being subjected to an acceleration force in a second direction. More particularly, accelerometer 20 is being subjected to an acceleration force 114 in X-direction 66 that is substantially parallel to X-axis 22. Thus, acceleration force 114 is referred to herein as X-axis acceleration 114 and is labeled $A_X$ in FIG. 5. First and second spring systems 34, 36 facilitate in-plane torsion motion of first and second proof masses 30, 32 in response to X-axis acceleration 114 imposed upon first and second proof masses 30, 32 in X-direction 52 substantially parallel to surface 38 of substrate 40. By way of example, as shown in FIG. 5, first proof mass 30 has pivoted about first pivot axis 65 and second proof mass 32 has pivoted about second pivot axis 67. Thus, FIG. 5 demonstrates in-plane torsion motion 116 of first and second proof masses 30, 32 in response to X-axis acceleration 114.

For X-axis acceleration ($A_X$), the capacitance change values ($\Delta C$) between electrodes 82, 84, 86, 88 and first and second proof masses 30, 32 can be used in a differential fashion to determine an output signal indicative of a magnitude of X-axis acceleration 114, as follows:

$$A_X = (\Delta C_A + \Delta C_D) - (\Delta C_B + \Delta C_C)$$

Figure 6:
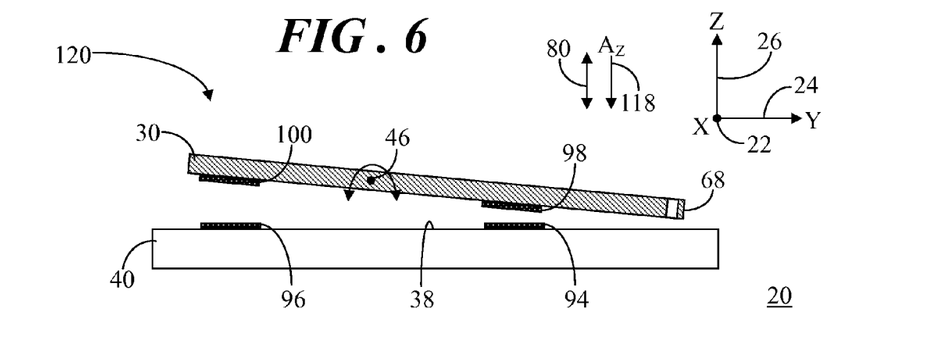
FIG. 6 shows a simplified side view of the inertial sensor device being subjected to an acceleration force in a third direction.

FIG. 6 shows the simplified top view of accelerometer 20 from FIG. 3 being subjected to an acceleration force in a third direction. More particularly, accelerometer 20 is being subjected to an acceleration force 118 in Z-direction 80 that is substantially parallel to Z-axis 26. Thus, acceleration force 118 is referred to herein as Z-axis acceleration 118 and is labeled $A_Z$ in FIG. 6. First and second spring systems 34, 36 further facilitate out-of-plane rotational motion of first and second proof masses 30, 32 about rotational axis 46 in response to Z-axis acceleration 118 imposed upon first and second proof masses 30, 32 in Z-direction 80 substantially perpendicular to surface 38 of substrate 40. By way of example, as shown in FIG. 6, first and second proof masses 30, 32 have rotated about rotational axis 46 is a teeter totter fashion in response to Z-axis acceleration 118. Thus, FIG. 6 demonstrates out-of-plane rotational motion 120 of first and second proof masses 30, 32 in response to Z-axis acceleration 118.

For Z-axis acceleration ($A_Z$), the capacitance change values ($\Delta C$) between electrodes 94, 96 and first and second proof masses 30, 32 can be used in a differential fashion to determine an output signal indicative of a magnitude of Z-axis acceleration 118, as follows:

$$A_Z = (\Delta C_{Z+} - \Delta C_{Z-})$$

Figure 7:
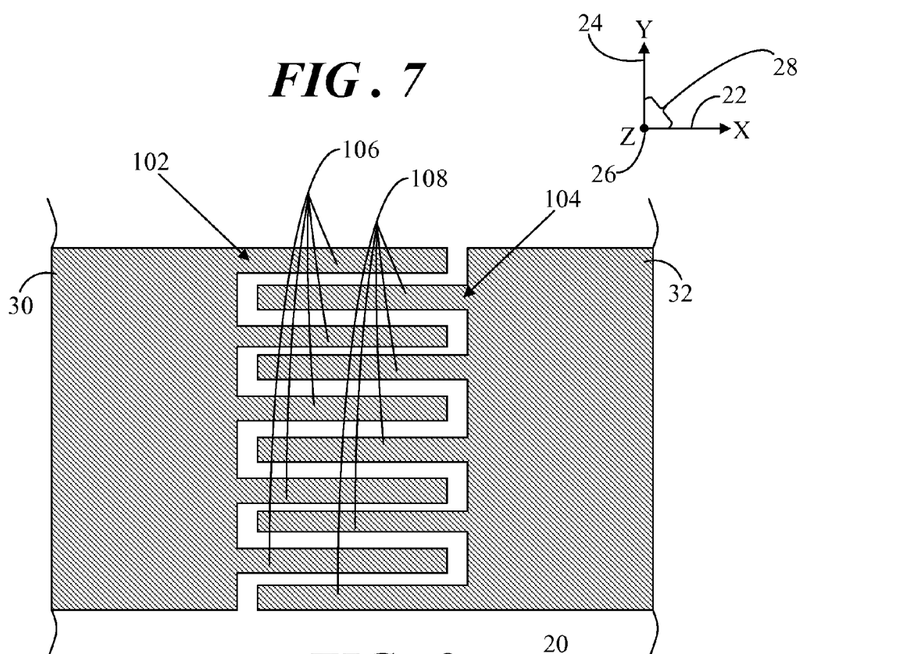
FIG. 7 shows a partial top view of the MEMS inertial sensor of FIG. 1 with damping structures integrated into dual movable elements of the MEMS inertial sensor.
Figure 8:
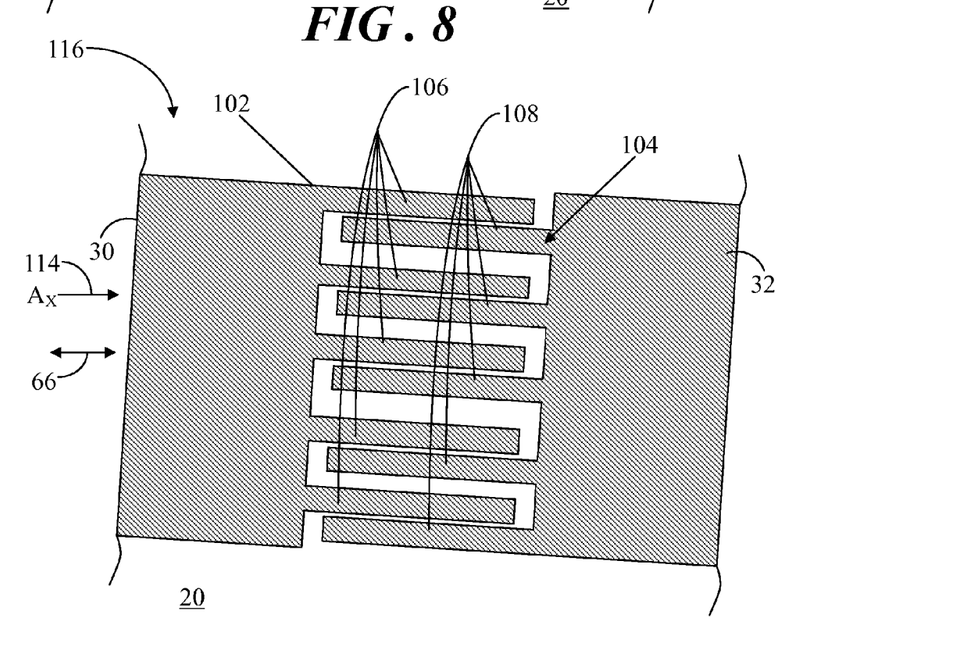
FIG. 8 shows the partial top view of the MEMS inertial sensor of FIG. 7 undergoing in-plane torsion motion.

Referring now to FIGS. 7 and 8, FIG. 7 shows a partial top view of accelerometer 20 with first and second damping structures 102, 104 integrated into first and second proof masses 30, 32 and FIG. 8 shows the partial top view of the accelerometer 20 of FIG. 7 undergoing in-plane torsion motion 116. FIG. 7 particularly demonstrates the inactive state of accelerometer 20 in which first and second proof masses 30, 32 are not being subjected to X-axis acceleration 114.

FIG. 8 shows a situation in which X-axis acceleration 114 results in in-plane torsion motion 116 of first and second proof masses 30, 32. When first and second proof masses 30, 32 undergo in-plane torsion motion 116, the motion of interleaved first and second fingers 106, 108 perpendicular to the faces of (i.e., the lengthwise sides of) fingers 106, 108 results in an effective increase in squeeze film damping relative to a system without such damping structures. This increase in squeeze film damping can advantageously dampen the oscillatory response of first and second proof masses 30, 32 that might otherwise damage accelerometer 20. Furthermore, by effectively dampening the oscillatory response (i.e., increasing the damping ratio), a change in the bandwidth of accelerometer 20 can be achieved.

In summary, the MEMS inertial sensors with improved sensitivity and reliability in small form factors. An embodiment of an inertial sensor comprises a substrate, a first movable element suspended from the substrate, and a second movable element suspended from the substrate and positioned laterally adjacent to the first movable element. Each of the first and second movable elements has a mass that is asymmetric relative to a rotational axis. A first spring system couples the first movable element to the substrate and a second spring system couples the second movable element to the substrate. The first and second spring systems enable the first and second movable elements to move together in response to force imposed upon the first and second movable elements in at least two orthogonal directions.

Another embodiment of an inertial sensor comprises a substrate, a first movable element suspended from the substrate, and a second movable element suspended from the substrate and positioned laterally adjacent to the first movable element. Each of the first and second movable elements has a mass that is asymmetric relative to a rotational axis. A first damping structure extends from a first inner edge of the first movable element toward the second movable element and a second damping structure extends from a second inner edge of the second movable element toward the first movable element. A first spring system couples the first movable element to the substrate and a second spring system couples the second movable element to the substrate. The first and second spring systems enable the first and second movable elements to move together. The first and second spring systems facilitate translatory motion of the first and second movable masses in response to a first force imposed upon the first and second movable elements in a first direction substantially parallel to a surface of the substrate. The first and second spring systems further facilitate in-plane torsion motion of the first and second movable masses in response to a second force imposed upon the first and second movable elements in a second direction substantially parallel to the surface of the substrate, the second direction being substantially orthogonal to the first direction. The second damping structure is operatively coupled with the first damping structure to dampen an oscillatory response of the first and second movable masses resulting from the in-plane torsion motion.

Embodiments described herein can provide relatively small device size, with improved sensitivity and reliability, by facilitating the sharing of proof masses for sensing in all three directions. More particularly, the dual proof mass configuration can undergo relatively large deformation under in-plane torsion motion in response to force imposed in a sense direction. This relatively large deformation can provide improved sensitivity in the sense direction. Additionally, a damping structure may be integrated into the inertial sensor to effectively achieve a greater damping ratio for the in-plane torsion motion with negligible impact on device sensitivity in the sense direction. The dual proof mass configuration and the damping structure may improve the overall efficiency of in-plane torsion motion of the inertial sensor.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An inertial sensor comprising:
    a substrate;
    a first movable element suspended from said substrate;
    a second movable element suspended from said substrate and positioned laterally adjacent to said first movable element, each of said first and second movable elements having a mass that is asymmetric relative to a rotational axis;
    a first spring system coupling said first movable element to said substrate; and
    a second spring system coupling said second movable element to said substrate, wherein said first and second spring systems enable said first and second movable elements to move together in response to force imposed upon said first and second movable elements in at least two orthogonal directions, wherein:
        said first and second spring systems facilitate translatory motion of said first and second movable elements in response to a first force imposed upon said first and second movable elements in a first direction substantially parallel to a surface of said substrate; and
        said first and second spring systems further facilitate in-plane torsion motion of said first and second movable elements in response to a second force imposed upon said first and second movable elements in a second direction substantially parallel to said surface of said substrate, said second direction being substantially orthogonal to said first direction.

2. The inertial sensor of claim 1 wherein said first and second spring systems further facilitate out-of-plane rotational motion of each of said first and second movable elements about said rotational axis in response to a third force imposed upon said first and second movable elements in a third direction substantially perpendicular to said surface of said substrate.

3. The inertial sensor of claim 1 further comprising a beam interconnected between said first and second movable elements.

4. The inertial sensor of claim 3 wherein:
    said first movable element includes a first portion positioned on a first side of said rotational axis and a second portion positioned on a second side of said rotational axis, said first portion having greater mass than said second portion;
    said second movable element includes a third portion positioned on said first side of said rotational axis and a fourth portion positioned on said second side of said rotational axis, said third portion having greater mass than said fourth portion; and
    said beam has a first end coupled to a first outer edge of said first portion of said first movable element and a second end coupled to a second outer edge of said third portion of said second movable element, said first and second outer edges being distal from a midline of said inertial sensor disposed between said first and second movable elements.

5. The inertial sensor of claim 1 wherein:
    said first and second movable elements are disposed on opposing sides of a midline positioned between said first and second movable elements, said midline being oriented substantially parallel to a direction of said translatory motion of said first and second movable elements; and
    said rotational axis is substantially parallel to a surface of said substrate and substantially perpendicular to said midline.

6. The inertial sensor of claim 1 wherein:
    said first spring system includes a first anchor element coupled to said substrate at said rotational axis and a first spring having a first end coupled to said first anchor element and a second end coupled to said first movable element; and
    said second spring system includes a second anchor element coupled to said substrate at said rotational axis and a second spring having a third end coupled to said second anchor element and a fourth end coupled to said second movable element.

7. The inertial sensor of claim 1 further comprising first, second, third, and fourth electrodes coupled to a surface of said substrate, wherein:
    for said first movable element, said first and second electrodes are positioned proximate a first outer edge of said first movable element and said third and fourth electrodes are positioned proximate a first inner edge of said first movable element; and
    for said second movable element, said first and second electrodes are positioned proximate a second inner edge of said second movable element and said third and fourth electrodes are positioned proximate a second outer edge of said second movable element, said first and second inner edges being positioned closer to a midline of said inertial sensor than said first and second outer edges.

8. The inertial sensor of claim 1 further comprising:
a first damping structure extending from a first inner edge of said first movable element; and
a second damping structure extending from a second inner edge of said second movable element toward said first movable element, said second damping structure being operatively coupled with said first damping structure to dampen an oscillatory response of said first and second movable elements.

9. The inertial sensor of claim 8 wherein:
said first and second damping structures dampen said oscillatory response of said first and second movable elements resulting from said in-plane torsion motion.

10. The inertial sensor of claim 8 wherein:
said first movable element includes a first portion positioned on a first side of said rotational axis and a second portion positioned on a second side of said rotational axis, said first portion having greater mass than said second portion;
said second movable element includes a third portion positioned on said first side of said rotational axis and a fourth portion positioned on said second side of said rotational axis, said third portion having greater mass than said fourth portion;
said first damping structure extends from said first portion of said first movable element; and
said second damping structure extends from said third portion of said second movable element.

11. The inertial sensor of claim 8 wherein:
said first damping structure comprises a plurality of first fingers extending from said first movable element; and
said second damping structure comprises a plurality of second fingers extending from said second movable element and interleaved with said first fingers.

12. An inertial sensor comprising:
a substrate;
a first movable element suspended from said substrate;
a second movable element suspended from said substrate and positioned laterally adjacent to said first movable element, each of said first and second movable elements having a mass that is asymmetric relative to a rotational axis;
a beam interconnected between said first and second movable elements;
a first spring system coupling said first movable element to said substrate, said first spring system including a first anchor element coupled to said substrate at said rotational axis and a first spring having a first end coupled to said first anchor element and a second end coupled to said first movable element; and
a second spring system coupling said second movable element to said substrate, said second spring system including a second anchor element coupled to said substrate at said rotational axis and a second spring having a third end coupled to said second anchor element and a fourth end coupled to said second movable element wherein said beam and said first and second spring systems enable said first and second movable elements to move together in response to force imposed upon said first and second movable elements in at least two orthogonal directions, and wherein:
said first and second spring systems facilitate translatory motion of said first and second movable elements in response to a first force imposed upon said first and second movable elements in a first direction substantially parallel to a surface of said substrate; and
said first and second spring systems facilitate in-plane torsion motion of said first and second movable elements in response to a second force imposed upon said first and second movable elements in a second direction substantially parallel to said surface of said substrate, said second direction being substantially orthogonal to said first direction.

13. The inertial sensor of claim 12 wherein:
said first and second spring systems facilitate out-of-plane rotational motion of each of said first and second movable elements about said rotational axis in response to a third force imposed upon said first and second movable elements in a third direction substantially perpendicular to said surface of said substrate.

14. The inertial sensor of claim 12 wherein:
said first movable element includes a first portion positioned on a first side of said rotational axis and a second portion positioned on a second side of said rotational axis, said first portion having greater mass than said second portion;
said second movable element includes a third portion positioned on said first side of said rotational axis and a fourth portion positioned on said second side of said rotational axis, said third portion having greater mass than said fourth portion; and
said beam has a first end coupled to a first outer edge of said first portion of said first movable element and a second end coupled to a second outer edge of said third portion of said second movable element, said first and second outer edges being distal from a midline of said inertial sensor disposed between said first and second movable elements.

15. The inertial sensor of claim 12 further comprising first, second, third, and fourth electrodes coupled to a surface of said substrate, wherein:
for said first movable element, said first and second electrodes are positioned proximate a first outer edge of said first movable element and said third and fourth electrodes are positioned proximate a first inner edge of said first movable element; and
for said second movable element, said first and second electrodes are positioned proximate a second inner edge of said second movable element and said third and fourth electrodes are positioned proximate a second outer edge of said second movable element, said first and second inner edges being positioned closer to a midline of said inertial sensor than said first and second outer edges.

16. An inertial sensor comprising:
a substrate;
a first movable element suspended from said substrate;
a second movable element suspended from said substrate and positioned laterally adjacent to said first movable element, each of said first and second movable elements having a mass that is asymmetric relative to a rotational axis;
a first damping structure extending from a first inner edge of said first movable element toward said second movable element;
a second damping structure extending from a second inner edge of said second movable element toward said first movable element;
a first spring system coupling said first movable element to said substrate; and
a second spring system coupling said second movable element to said substrate, said first and second spring systems enabling said first and second movable elements to move together, wherein:

said first and second spring systems facilitate translatory motion of said first and second movable elements in response to a first force imposed upon said first and second movable elements in a first direction substantially parallel to a surface of said substrate;

said first and second spring systems further facilitate in-plane torsion motion of said first and second movable elements in response to a second force imposed upon said first and second movable elements in a second direction substantially parallel to said surface of said substrate, said second direction being substantially orthogonal to said first direction; and said second damping structure is operatively coupled with said first damping structure to dampen an oscillatory response of said first and second movable elements resulting from said in-plane torsion motion.

17. The inertial sensor of claim 16 wherein:

said first movable element includes a first portion positioned on a first side of said rotational axis and a second portion positioned on a second side of said rotational axis, said first portion having greater mass than said second portion;

said second movable element includes a third portion positioned on said first side of said rotational axis and a fourth portion positioned on said second side of said rotational axis, said third portion having greater mass than said fourth portion; and said inertial sensor further comprises a beam, said beam having a first end coupled to a first outer edge of said first portion of said first movable element and a second end coupled to a second outer edge of said third portion of said second movable element, said first and second outer edges being distal from a midline of said inertial sensor disposed between said first and second movable elements.

18. The inertial sensor of claim 16 wherein:

said first movable element includes a first portion positioned on a first side of said rotational axis and a second portion positioned on a second side of said rotational axis, said first portion having greater mass than said second portion;

said second movable element includes a third portion positioned on said first side of said rotational axis and a fourth portion positioned on said second side of said rotational axis, said third portion having greater mass than said fourth portion;

said first damping structure extends from said first portion of said first movable element; and said second damping structure extends from said third portion of said second movable element.

19. The inertial sensor of claim 16 wherein:

said first damping structure comprises a plurality of first fingers extending from said first movable element; and said second damping structure comprises a plurality of second fingers extending from said second movable element and interleaved with said first fingers.

* * * * *